May 12, 1959 — H. WURZEL — 2,886,355
COUPLED ASSEMBLIES AND COUPLING RING FOR USE THEREIN
Filed Aug. 9, 1955
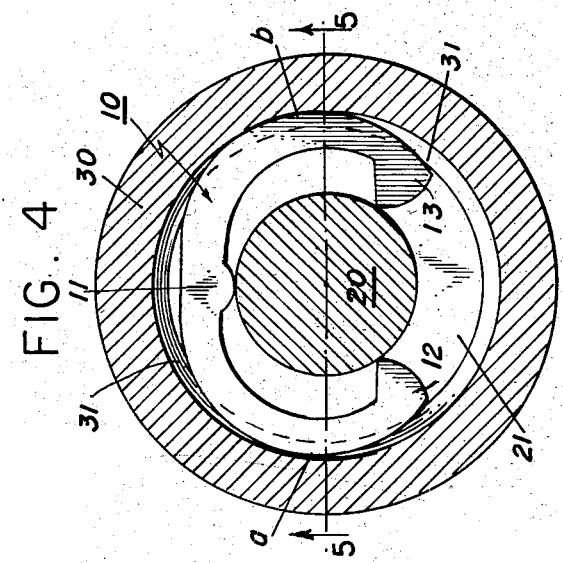
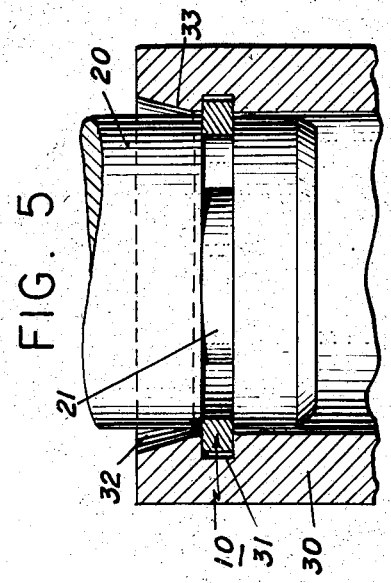
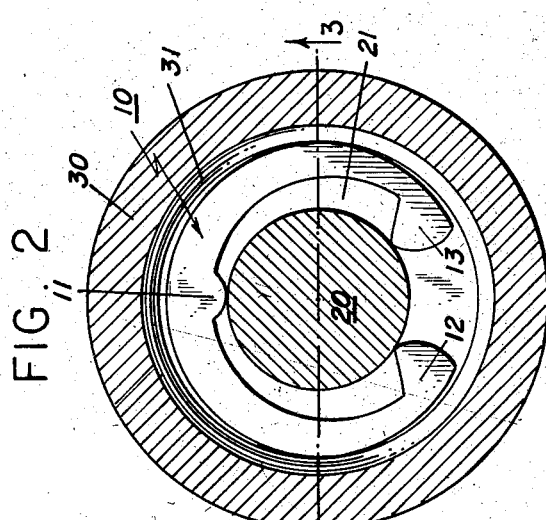
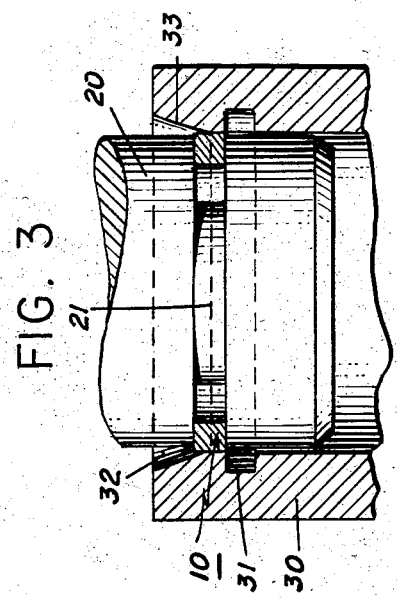
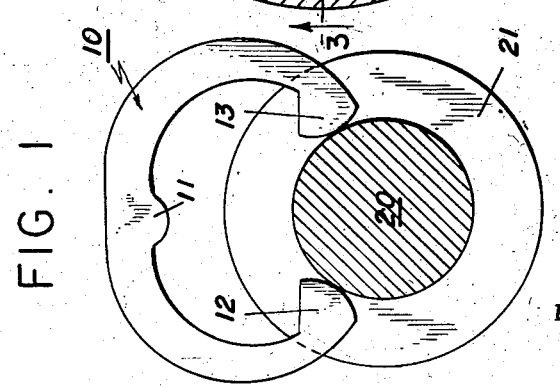
INVENTOR
HUGO WURZEL
ATTORNEY United States Patent Office 2,886,355
Patented May 12, 1959

2,886,355

COUPLED ASSEMBLIES AND COUPLING RING FOR USE THEREIN

Hugo Wurzel, New York, N.Y., assignor to Waldes Kohinoor, Inc., Long Island City, N.Y., a corporation of New York Application August 9, 1955, Serial No. 527,345

2 Claims. (Cl. 287—52)

This invention relates to improvements in coupled assemblies and in a coupling ring for use therein, and more specifically to an improved shaft-in-housing coupling and to an improved retaining-ring form of coupler or connector for such a coupling.

A principal object of the invention is the provision of an improved coupled assembly (for convenience hereinafter referred to as a "coupling") consisting of a shaft, a housing into which the shaft extends, and an open spring retaining-ring form of coupler extending between and connecting said shaft and housing and serving to tightly and securely hold the shaft against axial separation from the housing.

More particularly the invention aims to provide an improved shaft-in-housing coupling characterized by a spring retaining ring form of coupler which elastically locks itself into radially aligned oppositely facing grooves provided in adjacent surfaces of shaft and housing so as to provide a bridge therebetween, in turn serving to lock the shaft and housing together.

Yet another object of the invention is the provision of a coupling as last stated, wherein the entrance end of the housing bore is so sloped in advance of the housing bore groove as to effect contraction of the open retainer ring, preliminarily seated in the shaft groove and moving into said bore with said shaft, the necessary amount enabling the ring to move more or less freely into and along said bore to the plane of said housing bore groove into which it releases to complete the coupling.

Another important object of the invention is the provision of an open spring retaining ring which is peculiarly adapted to provide a coupler or connector for tightly and securly locking a shaft in a housing bore.

Still another object of the invention is the provision of a retaining ring form of coupler between shaft and a housing into which the shaft extends, which is capable of contracting into the groove of one and of thereupon expanding into the groove of the other, as is or may be necessary in initially completing and in thereafter maintaining the coupling.

A more particular object of the invention is the provision of an open spring retaining ring form of coupler for a shaft and housing having corresponding grooves adapted when radially aligned to jointly receive the ring, characterized by its ability to deform within its elastic range in both radial directions as required initially to effect bottoming of the ring in said grooves and thereafter to maintain the ring locked in said grooves, thereby effectively coupling shaft and housing.

Still another object of the invention is the provision of an open spring retaining ring designed for service as a coupler between a shaft extending into a housing bore and the housing, which is shaped substantially as an ellipse whose major axis extends on a transverse diameter of the ring body, i.e. a diameter extending at right angles to the so-called vertical diameter which passes through the middle of the gap between the open ends of the ring to the ring middle section.

A still further object of the invention is the provision of an elliptically shaped spring retaining ring designed for use as a coupler between a shaft and a housing, and which is so constructed and arranged as to tend to contract to more or less circular shape.

The above and other objects and advantages of a coupled assembly of shaft in housing and of a retaining-ring form of coupler for use in such an assembly will be clear from the following detailed description thereof, taken with the accompanying drawings, in which—

Fig. 1 is a plan view of a retaining-ring form of coupler according to the invention in its free state, the ring being shown as about to be assembled in the groove of a shaft which is to be coupled to a housing by said ring;

Fig. 2 is a transverse section through the assembly of housing and shaft following insertion of the shaft in the housing bore but before completion of the coupling;

Fig. 3 is a section taken along line 3—3 of Fig. 2; and

Figs. 4 and 5 are sectional views corresponding to Figs. 2 and 3 but illustrating the completion of the coupling as results from the ring having expanded into the housing bore groove.

Referring to the drawings, a retaining-ring form of coupler as herein proposed corresponds generally to a so-called "open" retaining ring, that is to say, its arcuate or segmental body 10, in addition to being characterized by progressively decreasing cross-section height (radial width) from its middle section to near its free ends, defines between said open ends a gap having width which is slightly less than the diameter of the bottom of the groove in which it seats but large enough to permit the ring body being spread directly over the shaft in the plane of the said groove. Accordingly, when properly dimensioned, such a ring may be assembled in its shaft groove simply by spreading it over the shaft directly in the plane of said groove. Also, the ring is of the general type known to the trade as an "E" ring, as derives from the fact that it is usually (although not necessarily) provided along its inner edge with a radially inward middle protrusion 11 and at its free ends with radially inward lugs or protrusions 12, 13 whose inner edges are arcuate and extend along arcs of a common circle which, in the free or unstressed state of the ring, has diameter, hereinafter termed "the effective minimum free diameter," which is slightly less than the diameter of the bottom of the shaft groove in which the ring is to be assembled. Accordingly, upon such a ring being spread over the shaft in the plane of its groove and thereupon pushed transversely of the shaft into said groove, it grips the bottom of the groove with the requisite force as to hold itself firmly seated in the groove.

According to the invention, the aforesaid ring, rather than having circular contour as is conventional, is shaped generally as an ellipse whose major axis is disposed transversely to the so-called vertical diameter of the ring, i.e. a diameter extending through the middle of the gap between the open ends of the ring body and thence to the middle section thereof. By design, the effective free outer-edge diameter of the ring, i.e. its unstressed greater external diameter as measured along said major axis, is somewhat greater than the diameter of the circle of the groove of the housing bore in which the ring is also to be assembled, whereby when assembled in said groove it secures itself against the bore-groove bottom with spring pressure. It is also a feature of such an elliptical or oval open retaining ring that when radially inward contracting pressure is applied to its outer edge the ring tends to contract circularly and to a diameter approaching the smaller diameter of the ring as measured along the aforesaid vertical diameter.

A retaining ring as aforesaid provides the coupler for a coupled assembly including shaft 20 and housing 30, which is completed upon the ring being seated along its inner edge in a groove 21 provided in the outer peripheral surface of the shaft, and along its outer edge in an oppositely facing groove 31 provided in the bore-defining wall of said housing. As seen in Figs. 3 and 5, the diameter of the shaft 20 is preferably such that the shaft has slide fit in the bore of housing 30, and by reference to Fig. 5 it will be seen that when fully assembled the ring 10 serves to tightly and securely hold the shaft to and against axial movement in either direction with respect to the housing.

To enable assembly of the ring 10 in the housing-bore groove 31 while at the same time permitting the shaft 20 to be moved into the bore to an axial position such that its groove 21 is in radial alignment with the said groove 31, the shaft entrance end 32 of the bore is formed sufficiently large as to comfortably receive the ring following its assembly in the shaft groove 21, and the bore surface 33 extending from said enlarged entrance end to a point in advance of the groove 31 is coned so as to have gradually decreasing diameter as effects a gradual contraction of a ring being moved axially therealong to an external diameter corresponding substantially to the diameter of the bore, in advance of the ring arriving at the plane of said groove 31.

Thus, to complete the coupling of shaft in housing according to the present invention, the ring 10 is first assembled in the shaft groove 21 by spreading it over the shaft 20 in the plane of said groove, whereupon it grips against the shaft-groove bottom. The shaft with ring assembled thereon as aforesaid is then pushed into the bore of the housing 30. Upon the outer edge of the ring engaging on the coned entrance portion 33 of the bore, the ring is progressively contracted until finally its greater diameter corresponds to the normal diameter of the bore, as illustrated in Figs. 2 and 3. It will be noted here that when so contracted the ring tends to assume a circular shape and hence has greater outer-edge contact with the bore surface (and bore-groove bottom) than if it remained elliptical. As also seen in Fig. 2 particularly, the ability of the ring to contract, without being over-stressed, the substantial amount required for it to be moved along the housing bore stems at least in part from the fact that in contracting the free ends of the ring move together but at the same time they are constrained to follow the curvature of the bottom of the shaft groove. Hence the contraction that necessarily takes place is a controlled contraction, in addition to one that is very gradual in its effect.

With the ring 10 now contracted to an effective external diameter corresponding to the internal diameter of the housing bore (Fig. 3), the shaft is given the further movement into the bore necessary to bring its groove 21 (and the ring also) into radial alignment with, or more simply to the plane of, the housing bore groove 31. When such is effected, the ring in tending to return to its original shape expands into said housing bore groove 31 (Fig. 5). By design, the depth of said groove is less than that which would permit the ring to regain its free elliptical or oval shape, with the result that the outer edge of the ring bears tight against the groove bottom at two diametrically opposed points a and b on its outer periphery, and that substantial arcuate length portions of the outer edge of the ring which extend to the sides of said points are sunk into the groove, whereby the ring is firmly locked to the housing. Also, although the ring expands into the housing bore groove as aforesaid, its design is such that it is nevertheless sufficiently contracted in the shaft groove 21 that its inner edge protrusions 11, 12 and 13 not only bear tightly against the bottom of said groove, but also they grip said bottom throughout a greater arc than results upon normal assembly of ring in groove, the latter feature being due to the tendency of the ring to approach circular contour when contracted. Moreover, since the depth to which the ring is sunk into the groove 21 is substantial, and since the ring is constrained against being spread by engagement of its outer edge against the bottom of the housing bore groove 31, the ring when finally seated becomes effectively locked to the shaft 20.

From the above it will be appreciated that the invention provides a coupling between shaft and housing which not only is very simple and easy to assemble and which not only secures the shaft effectively to the housing, but also one which positively excludes any play between shaft and housing due to loose fit of the coupling member (ring) in its grooves. It will also be seen that the invention provides a highly effective open spring retaining-ring type of coupler for use in a coupled assembly or coupling as aforesaid which can be simply and economically manufactured and installed as are conventional open retaining rings. However, as many changes could be made in carrying out the above constructions without departing from the scope of the invention, it is intended that all matter contained in the above description or shown in the accompanying drawing shall be interpreted as illustrative and not in a limiting sense.

I claim:

1. A coupling comprising, in combination, a housing having a bore, a shaft extending into said bore, said shaft and bore having oppositely facing grooves disposed in radial alignment, a spring retaining ring having its inner-edge portion seating in the shaft groove and its outer-edge portion seating in the housing bore groove thereby to couple said housing and shaft, said ring comprising an open-ended, elliptically shaped ring body consisting of a stamping of spring sheet metal and having its major axis disposed normal to the vertical ring-body center line which extends through its middle section and the gap between its open ends, said ring body having progressively decreasing cross-section height from its said middle section to its ends whereby it may be contracted to a substantially circular shape without taking on a predetermined set, said ring body further having an effective minimum free inner-edge diameter and a gap width which are slightly less than the diameter of the circle of the bottom of the shaft groove and further having an effective free outer-edge diameter as measured along its major axis which slightly exceeds the diameter of the circle of the bottom of the housing-bore groove, said ring body being in a state of contraction within the housing-bore groove whereby it bears tightly on the bottom wall of said housing-bore groove at spaced, diametrically opposed points on its outer-edge which are located generally at the intersections of its major axis with said outer edge and whereby it also bears tightly on the bottom wall of the shaft groove at three circumferentially spaced points located at the middle and at both ends of its inner edge.

2. A coupling substantially as set forth in claim 1, wherein said effective inner edge of the ring is defined by the inner edges of protrusions extending radially inwardly from the inner edge-proper of said ring body at its middle section and at both ends thereof.

References Cited in the file of this patent

UNITED STATES PATENTS

| 502,686 | Tilton | Aug. 1, 1893 |
| 1,442,223 | Knebusch | Jan. 16, 1923 |
| 2,491,310 | Hermann | Dec. 13, 1949 |

FOREIGN PATENTS

| 275,904 | Switzerland | Sept. 1, 1951 |

OTHER REFERENCES

Waldes Truarc Retaining Ringo Catalog 4k/14, © 1946, page 5, item "E" Ring #5133.